(12) United States Patent
Ekanadham et al.

(10) Patent No.: US 7,539,844 B1
(45) Date of Patent: May 26, 2009

(54) PREFETCHING INDIRECT ARRAY ACCESSES

(75) Inventors: Kattamuri Ekanadham, Mohegan Lake, NY (US); Il Park, Fishkill, NY (US); Seetharami R. Seelam, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/144,952

(22) Filed: Jun. 24, 2008

(51) Int. Cl.
*G06F 12/00* (2006.01)

(52) U.S. Cl. .................. 711/213; 711/137; 711/217; 711/220; 712/209; 712/225

(58) Field of Classification Search ............... 711/137, 711/213, 217, 220, 221; 712/209, 225
See application file for complete search history.

(56) References Cited

U.S. PATENT DOCUMENTS

| | | |
|---|---|---|
| 5,694,568 A | 12/1997 | Harrison, III et al. |
| 6,138,212 A | 10/2000 | Chiacchia et al. |
| 7,165,148 B2 | 1/2007 | Nishiyama |

*Primary Examiner*—Jasmine Song
(74) *Attorney, Agent, or Firm*—Cantor Colburn LLP; Anne Dougherty

(57) ABSTRACT

A method for prefetching data from an array, A, the method including: detecting a stride, dB, of a stream of index addresses of an indirect array, B, contents of each index address having information for determining an address of an element of the array A; detecting an access pattern from the indirect array, B, to data in the array, A, wherein the detecting an access pattern includes: using a constant value of an element size, dA; using a domain size k; executing a load instruction to load bi at address, ia, and receiving index data, mbi; multiplying mbi by dA to produce the product mbi*dA; executing another load instruction to load for a column address, j, where $1 \leq j \leq k$, and receiving address aj; recording the difference, aj−mbi*dA; iterating the executing a load instruction, the multiplying, the executing another load instruction, and the recording to produce another difference; incrementing a counter by one if the difference and the another difference are the same; and confirming column address j when the counter reaches a pre-determined threshold; executing a load instruction to load bi+dB and receiving index data nextmbi; and executing a load instruction to load Aj+nextmbi*dA, where Aj=(aj−mbi*dA) when the column address j is confirmed to prefetch the data from the array, A.

1 Claim, 3 Drawing Sheets

Indirect array accesses A[B[i]]

Step 21: access and update Table1 to establish recognizing b[i]

PREFETCHING INDIRECT ARRAY ACCESSES

BACKGROUND

1. Field of the Invention

This invention relates to prefetching data and, in particular, to prefetching data based upon previous data accesses.

2. Description of the Related Art

Prefetching data is an important technique used to improve the speed for executing a computer program. The speed of execution can be improved by fetching data from memory before the data is needed for use in a central processing unit.

Several techniques for prefetching data have been developed. These techniques are used to prefetch data that is consecutive in an address space or strided with a constant stride. Some of the techniques particularize the prefetches for sequences of cache misses. Others store certain selected references and the associated data in a buffer and supply the references and the data faster upon reference. These techniques either use differences between references made in a neighborhood or compare addresses with returned data to detect accesses through linked lists. When two records are located at addresses a and b, the address b is stored at a constant offset from the location at address a. Hence, by tracking the constant offset between data returned, when the link in a record is accessed, and the beginning address of that record, chained accesses can be tracked and prefetched.

However, the above techniques of tracking linked accesses cannot be used when accesses are made, not by link addresses, but by array indices stored in other arrays. Thus, when accessing the sequence A[B[I]]. I=1, 2, . . . , the data returned for array B[I] is not an address. Instead, the data returned is an index of Array A and is not related to the previous address by a constant.

Therefore, what are needed are techniques for accessing data by array indices stored in another array.

BRIEF SUMMARY

The shortcomings of the prior art are overcome and additional advantages are provided through the provision of a method for prefetching data from an array, A, the method including: detecting a stride, dB, of a stream of index addresses of an indirect array, B, contents of each index address having information for determining an address of an element of the array A wherein the detecting a stride includes: executing a load instruction to load bi at instruction address, ia, a first time and receiving a first memory access address; executing the load instruction a second time and receiving a second memory access address; and recording a difference between the first memory access address and the second memory access address as the stride, dB; detecting an access pattern from the indirect array, B, to data in the array, A, wherein the detecting an access pattern comprises: using a constant value of an element size, dA; using a domain size k; executing a load instruction to load bi at address, ia, and receiving index data, mbi; multiplying mbi by dA to produce the product mbi*dA; executing another load instruction to load for a column address, j, where 1≦j≦k, and receiving address aj; recording the difference, aj−mbi*dA; iterating the executing a load instruction, the multiplying, the executing another load instruction, and the recording to produce another difference; incrementing a counter by one if the difference and the another difference are the same; and confirming column address j when the counter reaches a pre-determined threshold; executing a load instruction to load bi+dB and receiving index data nextmbi; and executing a load instruction to load Aj+nextmbi*dA, where Aj=(aj−mbi*dA) when the column address j is confirmed to prefetch the data from the array, A.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution for prefetching indirect array accesses. By prefetching indirect array accesses, the speed of execution of programs can be increased, especially in programs operating on sparse matrices.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Figure 1:
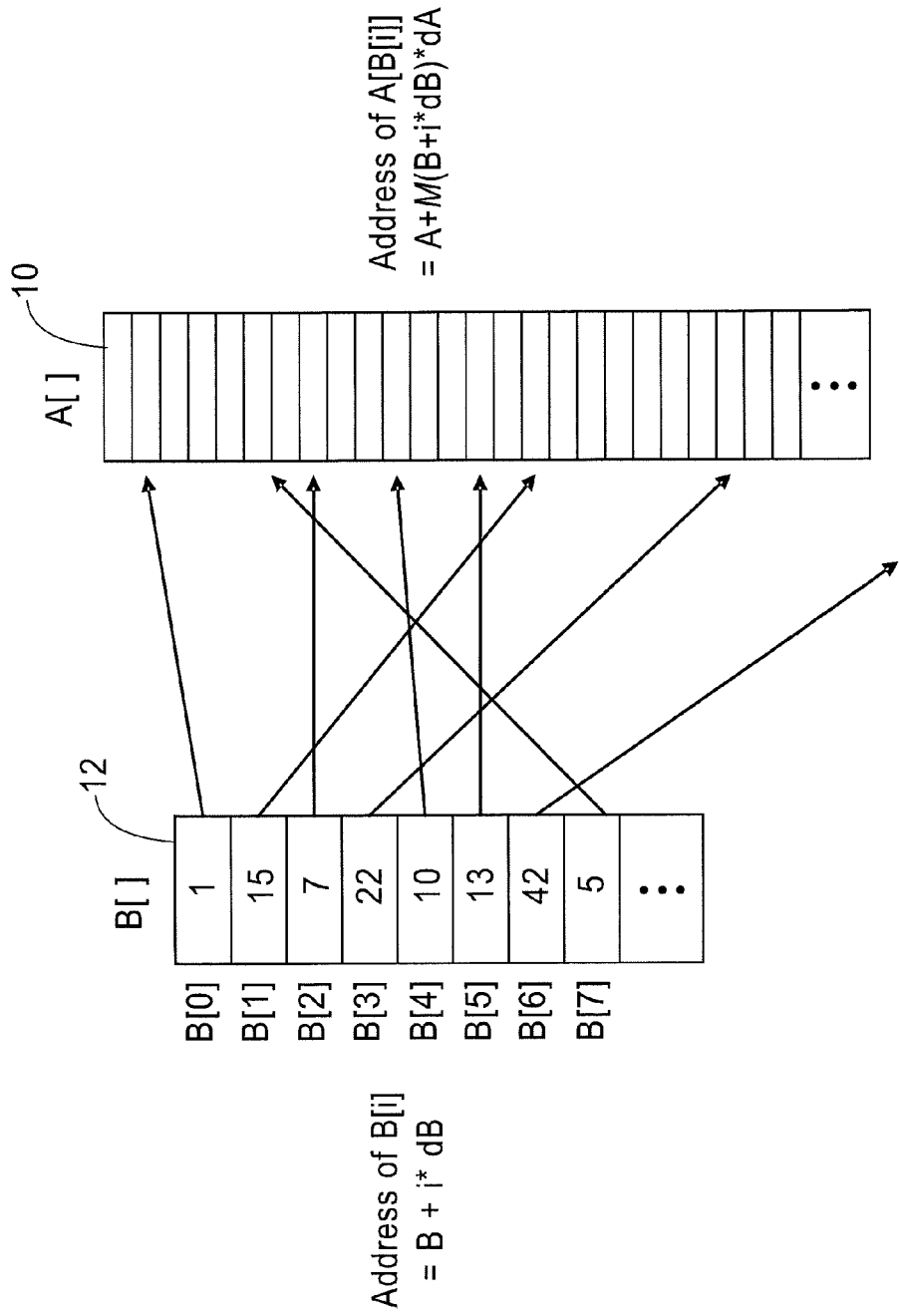
FIG. 1 depicts aspects of indirect array accesses.

Disclosed are techniques, which include a method, for accessing data by array indices that are stored in another array. Accessing data by array indices that are stored in another array is referred to as "indirect array accesses." FIG. 1 depicts aspects of indirect array accesses. For array A (element 10 in FIG. 1), the base address may be denoted by A, and the element size by dA. To obtain the data (called "target data") from the i-th element, the target address, A+i*dA, is first computed and then the instruction "load (A+i*dA)" is executed. Referring to FIG. 1, when accessing the data indirectly through another array B (indirect array B, element 12 in FIG. 1), first the target index is obtained by executing the instruction, "load (B+i*dB)". Next, the target data is obtained by executing the instruction "load (A+M(B+i*dB)*dA)", where M(x) denotes the contents of location at address x.

In scientific computations involving sparse matrices, the indices of desired elements of the array A may be computed and stored into another array B. The elements may be accessed indirectly as illustrated by the following pseudo-code: access A[B[iI]], i=0, . . . , n. Let X and dX respectively denote the starting address and element size of any vector X and let M[y] denote the contents of memory locations at address y. Then, the address sequence generated by the above program segment is given by {B+i*B, A+M[B+i*dB]*dA}, i=0, . . . , n. The method disclosed herein generates prefetching of these accesses.

The method tracks address and corresponding data sequences. For each strided sequence tracked, the method will also keep track of the corresponding data sequence. Given a constant (such as word size), the method tracks the data sequence multiplied by this constant (called weighted-data-sequence). By comparing the elements of the weighted-data-sequence with subsequent address access, the method can track the constant difference and prefetch the target data stream.

For convenience, certain definitions are provided. The term "indirect array" relates to an array that stores indices of another array or information for determining an address of an element of the another array. The term "stride" relates to the number of locations in memory between successive array elements. The stride is generally measured in bytes or in units the size of the array's elements. The term "load instruction" relates to an instruction to receive data from an address in an array listed in the load instruction.

Consider the following sequences:
(1) {B+i*dB, A+M[B+i*dB]*dA}, i=0, . . . , n
(2) {B+i*dB}, i=0, . . . , n
(3) {A+M[B+i*dB]*dA}, i=0, . . . , n
(4) {M[B+i*dB]}, i=0, . . . , n
(5) {M[B+i*dB]*dA}, i=0, . . . , n Sequence (1) is the indirect access sequence described above. Sequence (1) is the interleaving of subsequences (2) and (3). Sequence (4) is the sequence of data returned by memory in response to access sequence (2). Given that A and dA are constants, each element of the sequence (3) can be derived from sequence (4) by subtracting dA and dividing by dA. For instance, given the constant, dA, sequence (5) can be obtained from sequence (4) by multiplying with that constant and observe that sequences (5) and (3) differ by the constant, A.

For convenience, the following terminology is presented, which refers to four streams of information involved in indirect array accesses:

index-address stream: stream of addresses, B+i*dB, i=0, 1, 2, . . . , n of locations containing indirect indices.

index-data stream: stream of data, M(B+i*dB), i=0, 1, 2 . . . , n resulting from loads to the index-address stream.

target-address stream: stream of target addresses, A+M(B+i*dB)*dA, i=0, 1, 2 . . . , n containing target data.

target-data stream: stream of data, M(A+M(B+i*dB)*dA), i=0, 1, 2 . . . , n resulting from loads to target-address stream.

Using the above terminology, the following observations are made that show how the target data stream can be prefetched by observing the index-address stream and the index-data stream:

1. Generally, dA and dB are known constants, denoting the word size in bytes.
2. The index-address stream forms a strided-pattern with stride dB.
3. The load instruction, "load (A+M(B+i*dB)*dA)", that obtains the target data follows the load instruction, "load (B+i*dB)", that obtains the target index, within a small window of some k memory accesses.
4. Each item of the target address stream, A+M(B+i*dB)*dA, is derivable from the corresponding item of the index data stream, M(B+i*dB), using the constants dA and dB.
5. Hence, as each item of the index data stream is observed, a prefetch can be launched for the corresponding item of the target data stream.

One embodiment of the method for indirect array accesses is now presented with reference to the following table, Table 1:

| Instruc. address | Index address | Index stride | Index data * dA | Column-1 | . . . | Column-k |
|---|---|---|---|---|---|---|
| ia | bi | dB | mbi*dA | al-mbi*dA | | ak-mbi*dA |

The method when implemented by software and/or hardware may be referred to as a prefetch engine. The prefetch engine uses chosen values for the constants, k, dA, dB and can be tailored in many ways by choosing appropriate values or sets of values for these constants. The constant, k, may be related to a size of a domain of interest. The prefetch engine maintains Table 1, whose entries are filled in and used in steps as disclosed in a method 20 for prefetching indirect array accesses presented in FIG. 2.

Figure 2:
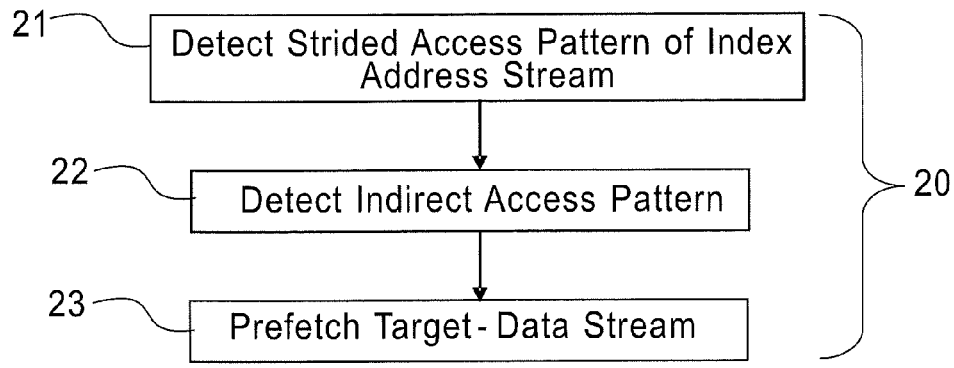
FIG. 2 presents a method for prefetching indirect array accesses.

Referring to FIG. 2, step 21 calls for detecting a strided access pattern of the index-address stream. Step 21 uses the first three columns of Table 1. Generally, when a load instruction is executed, the instruction address and the memory address being accessed are recorded in the first two columns of Table 1. Re-execution of the same instruction is detected by hashing on the instruction address and accessing this entry again. When the instruction is executed a second time, the difference between the previous and current memory access address is recorded in the third column of Table 1. The second column is updated with the new memory access address. From now onwards, each time this entry (column 2) is accessed, the successive strides are verified with the entry in the third column. Additional bits are used (not shown in Table 1) to confirm the entry after the stride is verified for a pre-determined number of times. Further accesses to the confirmed entry trigger a prefetch to the next memory address using the stride. Entries in Table 1 are deleted under pressure using a Least Recently Used (LRU) scheme.

Figure 3:
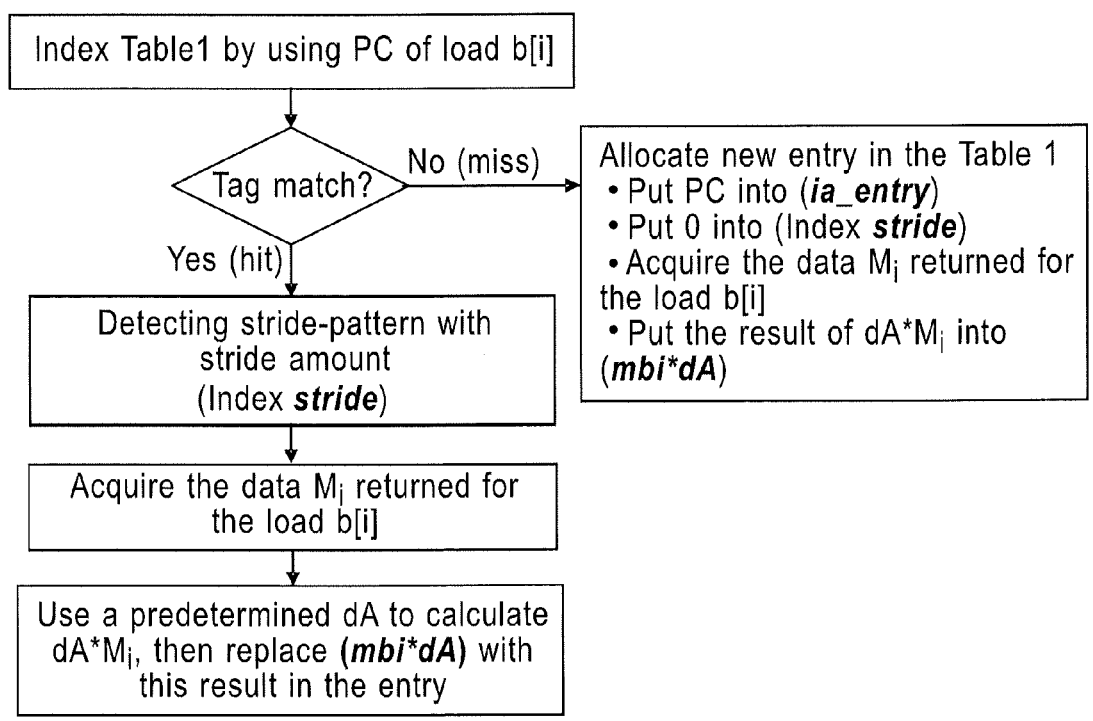
FIG. 3 presents a flow diagram depicting aspects of detecting stride of index-address stream using computer code.

FIG. 3 presents a flow diagram depicting aspects of implementing step 21 and the techniques disclosed herein using computer code.

Referring to FIG. 2, step 22 calls for detecting an indirect access pattern. A known constant value for dA is assumed (which is the element size of arrays of interest). Hence, it is needed to determine the value of A and a possible window size k during which the target data access takes place. The value of k is based on the table size one is willing to invest in hardware. For a given k, Table 1 contains k columns as depicted. The k columns are used as described next.

When an instruction, "load bi", at instruction address ia, occurs in step 1, the corresponding data, mbi, returned from memory is multiplied with the constant dA and the result is stored into column 4 (Index data*dA) of Table 1. After the entry into column 4, the intervals of execution between successive re-executions of the instruction at address ia, called "rounds," are monitored. In each round, the first k loads (to any memory addresses) are tracked as described next.

In the first round, for each "load some-address-j" instruction executed, (1<=j<=k), the address, aj, of the instruction is collected and the difference (aj−mbi*dA) is stored in column-j in Table 1 as shown. This process continues until the end of the round (i.e., until the instruction at instruction address ia is executed again). Any further accesses made in this round, beyond the k recorded loads, are ignored.

In the next round, again at the beginning of the round, the new index, bi, and the corresponding data, mbi, are collected.

The new index, bi, and the corresponding data, mbi, are stored in the respective columns of Table 1 as before. Then, the first k accesses of this round are monitored. For each access, the address, aj, is collected and the difference (aj−mbi*dA) is computed again. The new difference is compared with the previous difference recorded in the corresponding column. If the difference is same, a count is incremented (count is not shown in Table 1). The new difference replaces the old difference in the respective column. This process continues until the end of the round.

The above process continues for each round, until in some round the confirmation count for some column-J (in Table 1) reaches a pre-determined threshold, at which time that column is confirmed. If no column gets confirmed after a pre-determined number of trials, the entry is discarded.

Figure 4:
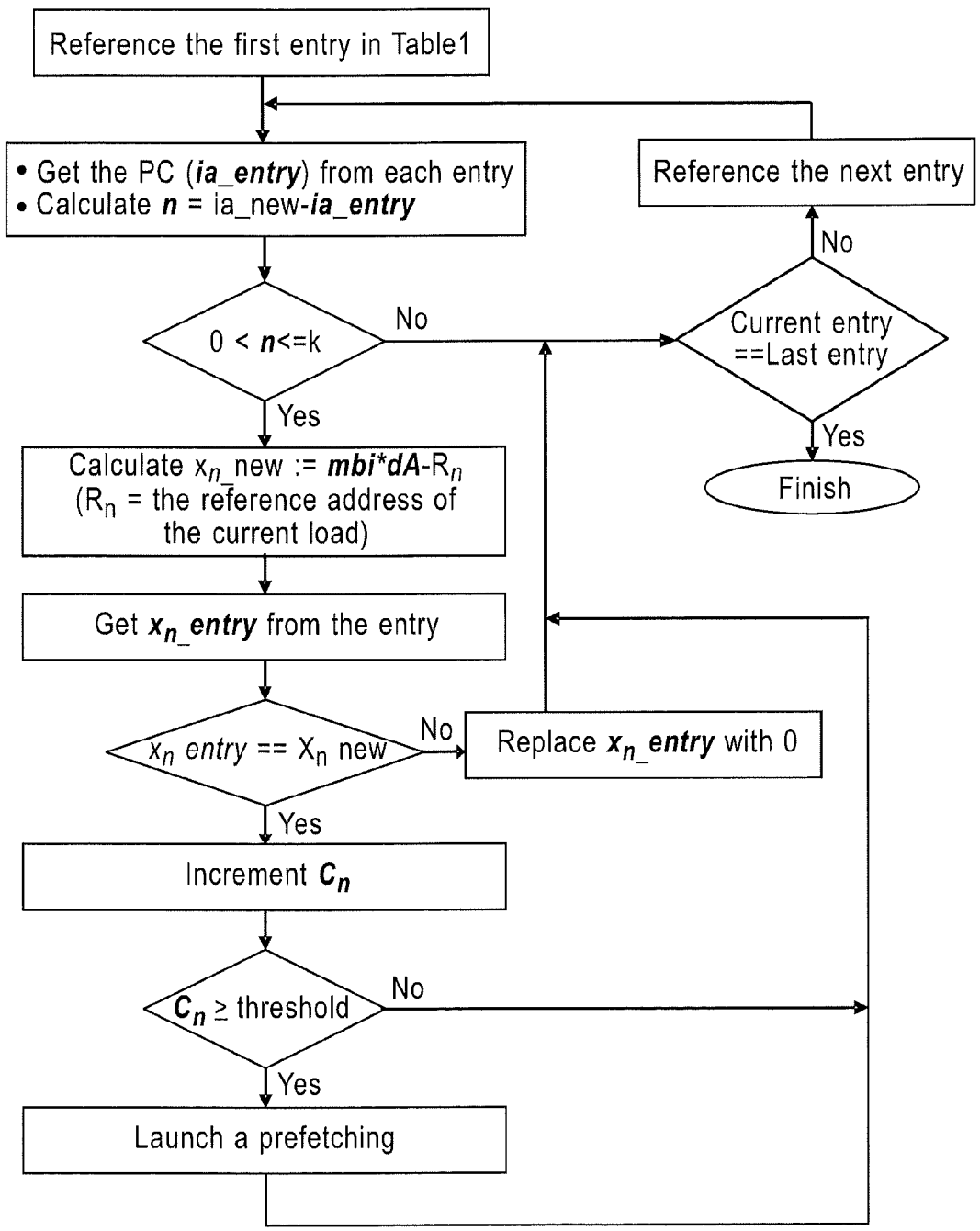
FIG. 4 presents a flow diagram depicting aspects of prefetching target-data stream using computer code.

FIG. 4 presents a flow diagram depicting aspects of implementing step 22 and the techniques disclosed herein using computer code.

Referring to FIG. 2, step 23 calls for prefetching the target-data stream. Step 23 uses the column-J's that are confirmed. The corresponding difference A=(aj−mbi*dA) is fixed as the expected address of the target array A. Each time the instruction at address ia is executed, the new index, bi, and the corresponding data, mbi, are collected. The corresponding data, mbi, are stored in the respective columns of Table 1 as described in step 22. Next, a prefetch is issued for next address (bi+dB) and the corresponding data nextmbi is collected. Next, a prefetch is issued for address A+nextmbi*dA to prefetch the data in array A.

In the method 20, the differences for corresponding accesses between a pair of rounds are compared. That is, the data from j-th access in one round is compared with data from the j-th access in the next round. Since the computations may involve conditionals, the accesses may not correspond so exactly. Instead, the method 20 can be modified so that data from an access in a round can be compared with every other access in the other round. This modified method will enhance the probability of successful detection of the pattern, at the expense of more space and time complexity in the hardware.

The method 20 can be modified to try a few fixed values for dB and dA (such as 4, 8, 16 bytes). By comparing with all possible values, the modified method 20 can detect strides for data structures of different sizes. Since word sizes are usually powers of 2, the multiplication can be accomplished by bit shifting.

The method 20 can also be modified to associate instruction addresses with each of the accesses in a round and make the comparisons for matching instruction addresses only. This modification will further enhance the prediction accuracy.

In one embodiment, hardware can be used for detecting the patterns as described above. Alternatively, instructions can be executed by a compiler or issued by a user to indicate the various fields of Table 1, after which the hardware simply prefetches them as if the values were confirmed to begin with. For instance, the instructions "load bi" and "load a+bi*dA" can be marked with special bits, so that the prefetching hardware can eliminate steps 22 and 23 of the method 20 and directly compute A after executing the marked instructions for the first time. This is a much more cost-effective way of accomplishing the prefetch mechanism and can be very effective as a designer can suggest more complex patterns of launching prefetches.

The capabilities of the present invention can be implemented in software, firmware, hardware or some combination thereof. In one embodiment, the method 20 can be implemented by executing an algorithm (written in a software program) with a computer processing system. The computer processing system generally includes components such as a processor, memory, an input device (such as a keyboard and mouse, an out device (such as a display or printer), a storage device, and an interface device. As the computer processing system is well known to those skilled in the art, the system and system components are not discussed in any detail herein.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

Elements of the embodiments have been introduced with either the articles "a" or "an." The articles are intended to mean that there are one or more of the elements. The terms "including" and "having" are intended to be inclusive such that there may be additional elements other than the elements listed. The term "or" when used with a list of at least two elements is intended to mean any element or combination of elements. The terms "first" and "second" are used to distinguish elements and are not used to describe an order.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claim which follows. This claim should be construed to maintain the proper protection for the invention first described.

What is claimed is:

1. A method for prefetching data from an array, A, the method comprising:
   detecting a stride, dB, of a stream of index addresses of an indirect array, B, contents of each index address comprising information for determining an address of an element of the array A wherein the detecting a stride comprises:
      executing a load instruction to load bi at instruction address, ia, a first time and receiving a first memory access address;
      executing the load instruction a second time and receiving a second memory access address; and
      recording a difference between the first memory access address and the second memory access address as the stride, dB;
   detecting an access pattern from the indirect array, B, to data in the array, A, wherein the detecting an access pattern comprises:
      using a constant value of an element size, dA;
      using a domain size k;
      executing a load instruction to load bi at address, ia, and receiving index data, mbi;
      multiplying mbi by dA to produce the product mbi*dA;
      executing another load instruction to load for a column address, j, where $1 \leq j \leq k$, and receiving address aj;

recording the difference, $a_j - mb_i \cdot dA$;

iterating the executing a load instruction, the multiplying, the executing another load instruction, and the recording to produce another difference;

incrementing a counter by one if the difference and the another difference are the same; and confirming the column address j when the counter reaches a pre-determined threshold;

executing a load instruction to load $b_i + dB$ and receiving index data nextmbi; and executing a load instruction to load $A_j + \text{nextmbi} \cdot dA$, where $A_j = (a_j - mb_i \cdot dA)$ when the column address j is confirmed to prefetch the data from the array, A.

* * * * *